C. E. FREUND.
AIRPLANE WING STRUCTURE.
APPLICATION FILED MAR. 31, 1919.
1,364,431.
Patented Jan. 4, 1921.
3 SHEETS—SHEET 2.
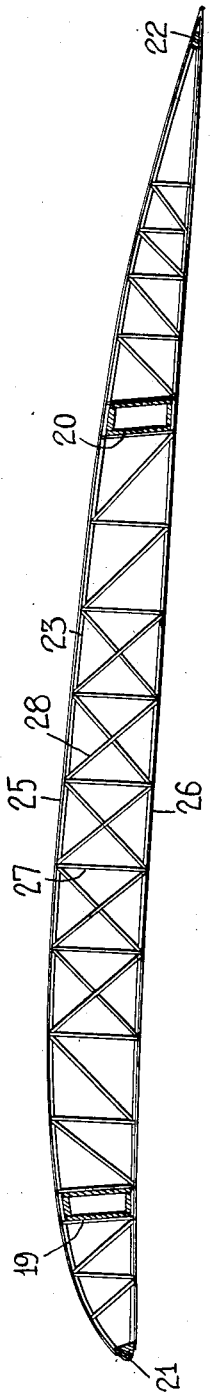
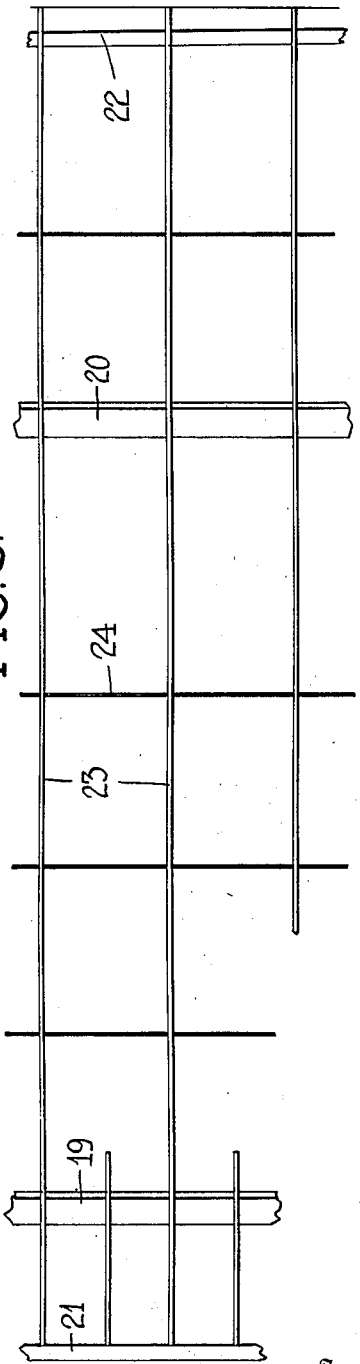
Inventor
CARL E. FREUND
By his Attorney

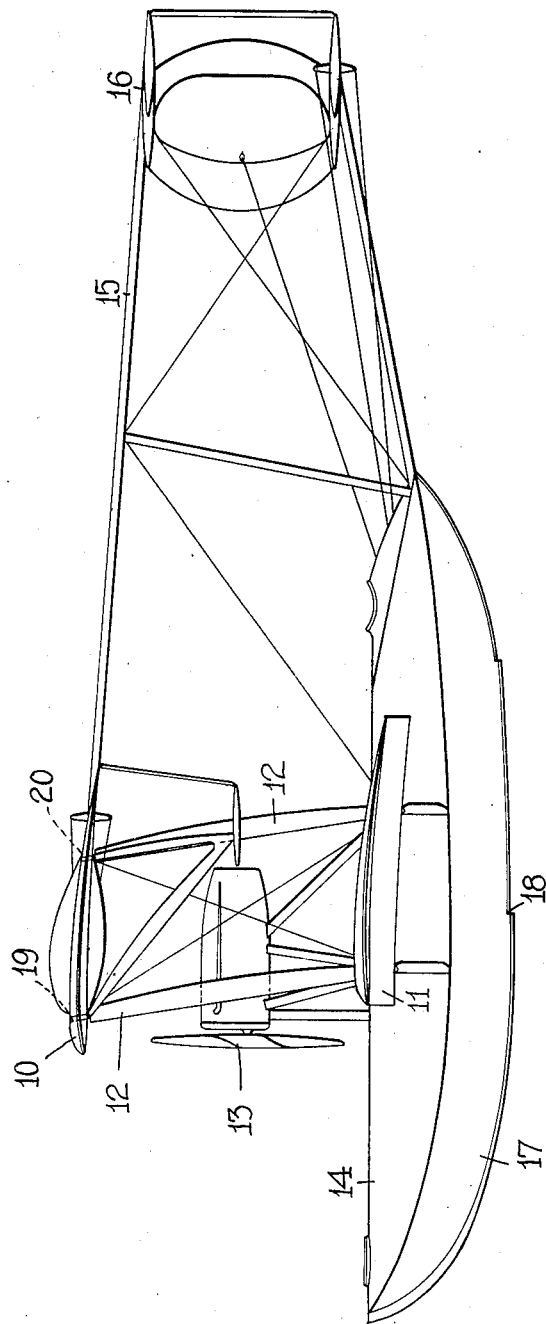

C. E. FREUND.
AIRPLANE WING STRUCTURE.
APPLICATION FILED MAR. 31, 1919.

1,364,431.

Patented Jan. 4, 1921.
3 SHEETS—SHEET 3.

Inventor
CARL E. FREUND.
By his Attorney
Chester H. Broselton

UNITED STATES PATENT OFFICE.

CARL E. FREUND, OF BUFFALO, NEW YORK, ASSIGNOR, BY MESNE ASSIGNMENTS, TO CURTISS AEROPLANE AND MOTOR CORPORATION, OF BUFFALO, NEW YORK, A CORPORATION OF NEW YORK.

AIRPLANE-WING STRUCTURE.

1,364,431.  Specification of Letters Patent.  Patented Jan. 4, 1921.

Application filed March 31, 1919. Serial No. 286,455.

*To all whom it may concern:*

Be it known that I, CARL E. FREUND, a citizen of the United States, residing at 252 Southampton St., Buffalo, in the county of Erie and State of New York, have invented certain new and useful Improvements in Airplane-Wing Structures, of which the following is a specification.

My invention relates to airplane wings and airplane wing structures and has reference more particularly to the location and arrangement of the wing beam or beams of the airplane wing or wings.

It is the usual practice in designing airplane wings and wing structures to locate the wing beam or beams at right angles to the chord of the wing, or if not at right angles to the chord at an angle to each other. This arrangement in a biplane or multiplane wing structure is undesirable and structurally deficient, especially so, if the fittings embodied in the wing structure truss are carried to or are fastened along the neutral axis or axes of the wing beam or beams. In either event the stresses set up in the wing beam or beams and in fact in the wing structure in its entirety are more or less dissymmetrical. Where the elements of the wing structure truss are not carried to the neutral axis or axes of the beam or beams no trouble is encountered although such an arrangement is not nearly so strong as the alternative. On the other hand to carry the elements to the neutral axis or axes of the beam or beams and still locate the beam or beams as stated, it is necessary to either bend the fittings or carry the wires and other elements of the wing truss off from the beam or beams at an angle. This arrangement is also objectionable. It is an object therefore of the present invention to overcome such difficulties and objections. Instead of arranging the beam or beams of the wing or wing structure as heretofore, the wing beam or beams are inclined to the vertical; that is to say, are so positioned relatively to the chord of the wing or wings as to make an angle therewith other than a right angle. This angle is in turn determined by the relative arrangement of the wings and wing posts. If the wings are forwardly staggered then the beams are given a corresponding forward angle of inclination, the angle of inclination in each instance corresponding with the angle of stagger whether it be negative, positive or zero. Such an arrangement admits of the use of unbent and simple fittings. It also admits of the attachment of the fittings or rather anchorages of the elements of the wing truss along the neutral axis or axes of the wing beam or beams of the wing. Accordingly the wing structure is made stronger, is designed better and the possibility of setting up dissymmetrical stresses in the wing structure avoided.

The inventive idea involved in the structure of the present invention is capable of receiving a variety of mechanical expressions, one of which, (the preferred) is shown in the accompanying drawings. It is to be expressly understood however that the drawings and particular construction shown and described are employed simply for the purpose of illustration and not for the purpose of defining the limits of the invention. For this purpose reference should be had to the claims.

Of the drawings:

Figure 1 is a side elevation of an airplane of the hydro-biplane type in which the wings are forwardly staggered and in which the wing beams of the wing are given an angular inclination corresponding with the forward stagger of the wings;

Fig. 2 is an enlarged cross sectional view of one of the airplane wings showing the relation of the wing beams to the chord of the wing;

Fig. 3 is a fragmentary top plan view of the wing;

Figure 4:
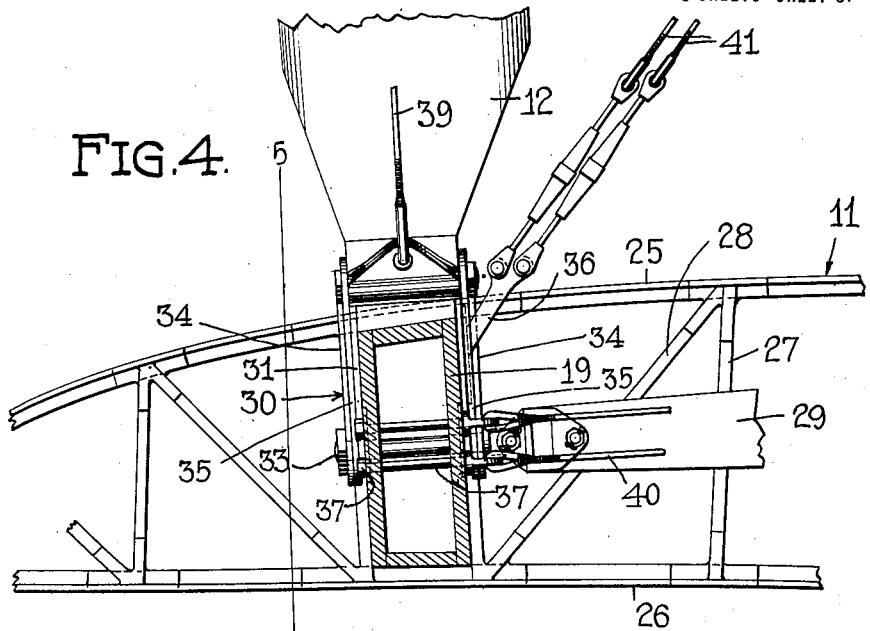
Fig. 4 is a detail cross sectional view of the forward wing beam of the lower wing showing the relation of the beam to the wing post or strut, the compression member of the wing, as well as the wires and other structural elements entering into and forming a part of the wing structure truss.

In the embodiment of the invention selected for illustration the supporting surfaces or airplane wings are designated as 10 and 11. They are interconnected in the usual manner by wing struts or wing posts 12. Intermediately of the wings the power plant 13 is located. Aft of the wings and supported jointly by the wing structure and by the body of the craft designated as 14, an outrigged tail structure is provided. The outriggers of the tail structure are designated as 15 and the empennage carried at the rear end of the tail structure is designated as 16. The empennage comprises the usual stabilizing surfaces and directional control surfaces which include rudders and elevator flaps. The body 14 of the machine is of the water borne type and is provided with a hydroplaning bottom 17 and rearwardly facing step or steps 18. One of the steps 18, where more than one are provided, is preferably located substantially beneath the center of gravity of the machine. As intimated however, the invention *per se* is applicable to any and all types of machines.

The airplane wings or supporting surfaces 10 and 11 are of a more or less conventional design except that the beams or spars thereof bear a different relation to certain of the remaining structural elements thereof, to the wing posts 12 and to the chord of the wing or wings. The wing beams herein shown are of the hollow or box-beam type and instead of making a right angle with the chord of the wing or wings they are inclined to the vertical to define angles less than a right angle. They are designated respectively as 19 and 20. Any number of such beams may be provided in lieu of the two beams disclosed.

In addition to the forward wing beam 19 and the rear wing beam 20 of the wing illustrated in Figs. 2 and 3, said wing comprises a nose strip 21, a trailing edge strip 22, ribs 23 and stringers 24, the ribs (see Fig. 2) in turn comprising top and bottom chords 25 and 26 and vertical and diagonal interconnections 27 and 28. At predetermined stations throughout the length of the wing compression members 29 are provided. These compression members (but one of which is shown) are confined to the space between the top surface and bottom surface of the wing and as is usual directly interconnect the forward and the rear wing beams 19 and 20. They enter into and constitute important elements embodied in the wing structure truss. A wing of the character just mentioned is extremely light and strong. In Fig. 1 of the drawings it will be noted that the wings 10 and 11 are forwardly staggered, that is, the upper wing 10 at its leading edge is extended slightly ahead of the corresponding edge of the lower wing. Such a stagger may or may not be accorded the wings. They may be, if desired, directly superposed, i. e., given a zero stagger or, if desired, reversely or negatively staggered. In either or any event, the inventive idea herein set forth is the same. The wing posts 12 in the preferred embodiment of the invention are given an angular inclination corresponding with the stagger of the wings. That is to say, the wing posts 12 are inclined to the vertical according to the degree of stagger. This is preferred for structural reasons and for the further reason that it is customary in the design of a biplane or multiplane to give all of the wings a uniform chord and consequently space the wing beams thereof substantially uniformly apart.

As hereinbefore explained it is desirable in airplane construction to carry the anchorages of the elements of the wing structure truss to the neutral axes of the wing beams. Such an arrangement affords maximum strength and avoids the possibility of setting up in the wing structure and more particularly the wing beams thereof, a dissymmetrical stress. To attain this end and at the same time in no way reduce the effective strength of the wing beams, the wing beams are given a stagger i. e., are inclined to the vertical to an extent equal to the angular inclination of the wing posts. If the wing posts are vertical and the wings have a zero stagger then the wing beams are likewise vertical although not at right angles to the chord of the wings since the latter make an angle to the line of flight. Usually this angle, which is the angle of incidence, varies between two and ten degrees. Accordingly the wing beams have a range of angularity of eight degrees since it is essential that the beams have an angular inclination corresponding with the degree of stagger and with the angular inclination of the wing posts 12. In Fig. 2 of the drawings the chord line of the wing illustrated is shown and also the datum line from which the angle of incidence of the wing is determined.

Figure 5:
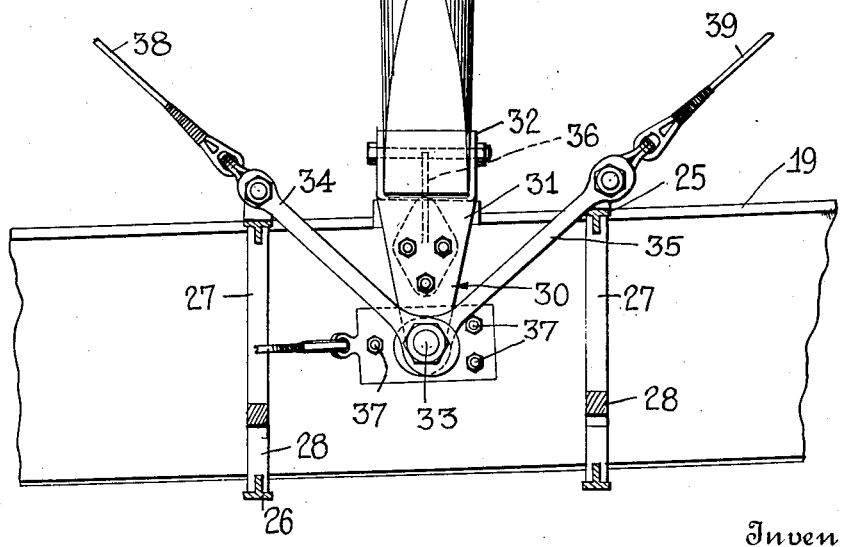
Fig. 5 is a section on the line 5—5 of Fig. 4.

The principal reason for inclining the wing beams in the manner stated is, as above explained, to avoid the use of bent fittings and still admit of the anchorage of the elements of the wing structure truss along the neutral axes of the beams. In Figs. 4 and 5 of the drawings a form of fitting is illustrated which is especially adapted to the character of wing structure claimed. Said fitting, designated in its entirety by the numeral 30, comprises a substantially inverted U-shaped plate 31, a socket 32, a retaining bolt 33 and anchorages 34, 35, 36 and 37. The socket 32 is brazed or otherwise permanently fastened to the inverted U-shaped member 31 and is of a size designed to snugly receive one end of a wing post. The inverted U-shaped member 31 straddles the wing beam and is held in place by the retaining bolt 33 which in turn penetrates the beam in a fore and aft direction and along its neutral axis. Said bolt 33 also provides a fastening means for the anchorages 34, 35 and 37, each of which anchorages is thus carried to the neutral axis of the beam. The anchorages 34 accommodate the landing or drop wires 38, the anchorages 35 the lift wires 39, the anchorages 37 the internal wing wires 40 and the anchorages 36 the stagger wires 41. The anchorages 36 are directly fastened to the inner extensions of the U-shaped members 31. In addition to providing anchorages for the mentioned elements of the wing truss the fittings 30 also provide anchorages for the compression members 29 of the wings. Said compression members are directly attached to the retaining bolts 33 and are thus likewise carried to the neutral axis of the beam. Were the beams 19 and 20 positioned at right angles to the chord of the wings as heretofore it would become necessary to either bend the fittings or carry the elements of the truss away from the beams at an angle. This is assuming of course that the elements of the fitting are carried to the neutral axes of the beam. If such or either course were pursued the beams 19 and 20 would be subjected to a bending stress or rather a twisting moment which would result in placing the entire wing structure under a dissymmetrical strain.

The foregoing location and arrangement of beams is especially desirable in aircraft of large proportions wherein the dissymmetrical stress resulting from the conventional practice is quite marked. The improved arrangement not only solves an important engineering problem but the advantages resulting from the improved arrangement are numerous. The fittings required may be of a simple construction; the factor of safety accorded the wing structure is increased, the necessity of bending the fittings or of carrying the elements of the truss off from the beams at an angle is eliminated; the stresses directly carried to the neutral axes of the beams, etc. In fact, the inclination of the beams to accord with the inclination of the wing posts or the stagger of the wings is an important development in the airplane art. By thus inclining the beams they may be said to make an angle with the axes of the compression members 29 other than a right angle since the compression members interconnect the beams in the horizontal plane of their respective neutral axes.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What is claimed is:

1. An airplane wing structure including superposed staggered wings, wing posts, and wing beams incorporated in the framework of the wings and inclined at an angle to the perpendicular of the chord, the degree of the inclination being substantially the same as the degree of stagger accorded the wings.

2. An airplane wing structure including superposed wings, wing posts inclined to the vertical, and a wing beam incorporated in the framework of each wing, the wing beam in each instance being inclined at an angle to the perpendicular of the chord, the degree of inclination being substantially the same as the degree of inclination accorded the wing posts.

3. In an airplane wing structure, the combination, of superposed wings, wing posts inclined to the vertical, wing beams incorporated in the framework of each wing, the wing beams in each instance being inclined at an angle to the perpendicular of the chord, the degree of inclination being substantially the same as the degree of inclination accorded the wing posts, and wing post fittings mounted at the ends of the wing posts and fastened to the wing beams along their neutral axes, the fittings in each instance being extended away from the axes of the beams in the direction of the longitudinal extent of the wing posts without a bend either in the fittings themselves or in the connection between the fittings and the posts.

4. An airplane wing structure including superposed wings presenting to the air a positive angle of incidence, wing posts, the wing post making an angle with the perpendicular to the chord of the wings other than a right angle, and wing beams incorporated in the framework of the wings in direct continuation of the wing posts, said wing beams being so positioned relatively to the chord of the wings as to likewise make an angle other than a right angle.

5. An airplane wing structure including in its *ensemble* a wing beam which is so positioned relatively to the perpendicular to the chord of the wing as to make an angle therewith other than a right angle, wing posts, the wing posts likewise making an angle with the chord of the wings other than a right angle and being so positioned relatively to the wing beams as to extend in alinement therewith, and fittings embodied in the wing structure at the ends of the wing posts, the fittings in each instance being extended straight away from the posts for anchorage at points along the neutral axes of the wing beams.

6. An airplane wing structure including superposed staggered wings, wing posts, wing beams incorporated in the framework of the wings and inclined at an angle to the perpendicular of the chord, the degree of inclination being substantially the same as the degree of stagger accorded the wings, and wing post fittings mounted at the ends of the wing posts and fastened to the wing beams, the fittings in each instance being extended off from the beams in the direction of the longitudinal extent of the wing posts without a bend either in the fittings themselves or in the connections between the fittings and the wing posts.

In testimony whereof I hereunto affix my signature.

CARL E. FREUND.